United States Patent
Ha et al.

(10) Patent No.: US 7,957,467 B2
(45) Date of Patent: Jun. 7, 2011

(54) CONTENT-ADAPTIVE BLOCK ARTIFACT REMOVAL IN SPATIAL DOMAIN

(75) Inventors: Victor Hyeong-Seok Ha, Irvine, CA (US); Yeong-Taeg Kim, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 1657 days.

(21) Appl. No.: 11/228,726

(22) Filed: Sep. 15, 2005

(65) Prior Publication Data

US 2007/0058726 A1 Mar. 15, 2007

(51) Int. Cl.
*H04N 11/04* (2006.01)
*H04B 1/66* (2006.01)
(52) U.S. Cl. .................. 375/240.24; 375/240.27
(58) Field of Classification Search .......... 375/240.24, 375/240.27
See application file for complete search history.

(56) References Cited

U.S. PATENT DOCUMENTS

| 6,529,638 | B1 | 3/2003 | Westerman | 382/275 |
| 6,823,089 | B1 * | 11/2004 | Yu et al. | 382/268 |
| 6,973,221 | B1 * | 12/2005 | Xue | 382/268 |
| 7,426,315 | B2 * | 9/2008 | Frishman et al. | 382/268 |
| 7,463,688 | B2 * | 12/2008 | Lin et al. | 375/240.18 |
| 7,561,623 | B2 * | 7/2009 | Park et al. | 375/240.29 |
| 7,711,054 | B2 * | 5/2010 | Hong | 375/240.29 |

* cited by examiner

*Primary Examiner* — Bhavesh M Mehta
*Assistant Examiner* — Stephen R Koziol

(57) ABSTRACT

An image processing method and system removes block artifacts in compressed image/video. Block artifacts are detected based on content analysis performed based on knowledge of the contents of the image/video. Then, a set of priority conditions is evaluated to generate a detection decision for each pixel at the block boundary. A higher priority is given to a short-term temporal processing result and a spatial processing result. The long-term temporal processing result and quantization information are treated as auxiliary information to adjust the strength of filtering. Depending on the result of the detection decision, appropriate filtering is applied to the pixel to remove the block artifacts.

34 Claims, 5 Drawing Sheets

CONTENT-ADAPTIVE BLOCK ARTIFACT REMOVAL IN SPATIAL DOMAIN

FIELD OF THE INVENTION

The present invention relates generally to noise reduction/removal from compressed images/videos, and more particularly to reduction/removal of the block artifacts that are caused by the block-based image compressing/coding schemes.

BACKGROUND OF THE INVENTION

Visual communication systems and applications advocate increasingly larger screens and higher resolutions. This tendency is amplified with the appearance of larger CRT, LCD, PDP, projector High-Definition (HD) display systems such as in TVs, and larger digitally processed and stored visual information in the form of MPEG, DVD, DV, etc. As such, it becomes very important to improve the quality of images and videos that are displayed on large screens at high resolution. TV sets often implement video post-processors that improve and enhance the image/video signals to be displayed. Post-processors in such TV sets perform many functions including, but not limited to, image scaling, image noise reduction, image detail enhancement, and image color enhancement to improve and enhance the image/video signals for display.

Digital video content may be initially processed and encoded by a variety of digital compression techniques to overcome the problem of data bandwidth limitation in communication networks. The current Digital TV (DTV) broadcasting in the U.S. uses the MPEG-2 international video compression standard to compress digital video contents. DVD video contents are also processed by MPEG-2. High definition (HD) contents may be processed by MPEG-2 or MPEG-4. These MPEG processed digital videos contain a varying degree of artifacts that deteriorate the quality of displayed video images. The artifacts in MPEG-processed digital videos are referred to as "MPEG noise", or "compression noise", herein. As such, compression noise reduction, such as MPEG noise reduction, is one of the main functions implemented by a post-processor in a TV set. Compression noise reduction is a process that detects and removes such annoying MPEG noises from the digital videos before display on a display system screen.

There are different types of MPEG compression noises. One class of MPEG noises is known as block artifacts which are caused by the block-based image compressing schemes.

Block artifacts arise in images/videos that are compressed by block-based coding schemes such as JPEG, MPEG, and H.26X. In these coding schemes, a video image is divided into an array of N-by-N rectangular blocks (e.g., N=16) that are called macroblocks. Then, each macroblock is again subdivided into M-by-M (e.g., M=8) sub-blocks. Each sub-block is typically processed by an M-by-M (e.g., 8-by-8) Discrete Cosine Transform (DCT), Quantization, Zig-zag scanning, and Entropy coding, independent of other sub-blocks. Because each sub-block (and each macroblock) is processed independently, a critical high-frequency portion of the image/video data that connects neighboring blocks is often lost and the superfluous edges and discontinuities appear at the block boundaries. Block artifacts are defined as appearances of these undesired superfluous edges or discontinuities at the block boundaries.

Block artifacts become more severe as the image/video is compressed more, i.e., at high compression rates. Also, scenes with high motion contents tend to contain more block artifacts.

The human visual system is extremely efficient at recognizing block artifacts. This is because humans have an extensive amount of visual knowledge and experience about what the world (objects and scenes) looks like. It is very easy, therefore, for humans to detect the artificially generated discontinuities and edges appearing across the picture at a regular interval. Even very small discrepancies are detected without much effort by a human viewer. On the other hand, machines lack the full-extent of visual knowledge that humans have. Specifically, conventional electronic devices or software programs that are built to detect and remove block artifacts rely only on very restricted inter-pixel, inter-block, or inter-frame relationships. Complete and accurate removal of block artifacts is therefore extremely difficult for such devices and programs. Many conventional devices/programs leave the block artifacts untreated or generate undesirable side-effects, such as blurring, as a result of inadequate processing mechanisms.

There is therefore a need for an image processing method and a system that collect and assemble, in an effective and intelligent manner, information about the contents of the image/video and effectively utilize such information to reduce/remove block artifacts in the compressed/coded image/video.

BRIEF SUMMARY OF THE INVENTION

In one embodiment, the present invention provides an image processing method and a system that collect and assemble, in an effective and intelligent manner, information about the contents of the image/video and effectively utilize such information to reduce/remove block artifacts in the compressed/coded image/video.

According to an embodiment of the present invention, an effective and efficient method for reduction/removal of block artifacts can benefit from knowledge of the contents of the image/video, including: (1) Low level of motion vs. High level of motion, (2) Low activity (Flat regions) vs. High activity (Patterned regions), and (3) Low compression rate vs. High compression rate. The measurement of motion content is achieved by analyzing a sequence of images along the temporal dimension. The motion vectors used by a motion estimation and compensation process of an MPEG decoder provide useful information in that regard. The activity levels of the spatial regions are estimated, for example, by computing the mean and variance of the current and neighboring blocks. Block artifacts in the low activity regions are removed more vigorously without serious side-effects, while block artifacts in the high activity regions are detected and processed more carefully to avoid discarding important image features and blurring the sharp patterns. Information about the compression rate, or the quantization parameter, helps indicate an overall degree of contamination of the visual integrity by block artifacts. When the compression rate is high, more block artifacts are expected, while the opposite is assumed otherwise.

A content-adaptive block artifact removal method and system according to the present invention removes block artifacts in compressed image/video. Block artifacts are detected based on the content analysis performed. Then, a set of priority conditions is evaluated to generate a detection decision for each pixel at the block boundary. A higher priority is given to a short-term temporal processing result and a spatial processing result. The long-term temporal processing result and quantization information are treated as auxiliary information to adjust the strength of filtering. Depending on the result of the detection decision, appropriate filtering is applied to the pixel to remove the block artifacts.

Other embodiments, features and advantages of the present invention will be apparent from the following specification taken in conjunction with the following drawings.

DETAILED DESCRIPTION OF THE INVENTION

Video compression refers to decreasing the amount of data (e.g., number of bits per second), that represents a video signal by exploiting spatiotemporal and statistical redundancy within the video signal. Examples of such compression techniques include Motion-JPEG, MPEG, H.26x, AVI, etc., wherein the degree of compression of digital video is represented by a range of measurable parameters, such as compression rates. Digital video includes a sequence of images, or video, generated by e.g. sampling and quantization applied to analog video signals.

Digital images and videos that are compressed by block-based compression techniques (JPEG, MPEG, H.26x) suffer from various MPEG noises, including block artifacts. Block artifacts are defined as undesired superfluous edges at the block boundaries. These edges are not part of real image features and must be removed in order to improve the visual quality of the picture. It is desirable to provide a simple and inexpensive device/method to handle a diverse range of image/video contents, qualities, and conditions.

According to an embodiment of the present invention, an effective and efficient method for reduction/removal of block artifacts can benefit from knowledge of the contents of the image/video, including: (1) Low level of motion vs. High level of motion, (2) Low activity (Flat regions) vs. High activity (Patterned regions), and (3) Low compression rate vs. High compression rate. The measurement of motion content is achieved by analyzing a sequence of images along the temporal dimension. The motion vectors used by a motion estimation and compensation process of an MPEG decoder provide useful information in that regard. The activity levels of the spatial regions are estimated, for example, by computing the mean and variance of the current and neighboring blocks. While block artifacts in the low activity regions can be removed more vigorously without serious side-effects, block artifacts in the high activity regions must be detected and processed more carefully to avoid discarding important image features and blurring the sharp patterns. Information about the compression rate, or the quantization parameter, helps indicate an overall degree of contamination of the visual integrity by block artifacts. When the compression rate is high, more block artifacts are expected, while the opposite is assumed otherwise.

Therefore, block artifacts are detected based on the content analysis performed in each of the three categories above. Then, a set of priority conditions is evaluated to generate a detection decision for each pixel at the block boundary. Depending on the result of the detection decision, appropriate filtering is applied to the pixel to remove the block artifacts. Block artifacts are detected by analyzing the contents of the image/video.

Figure 1:
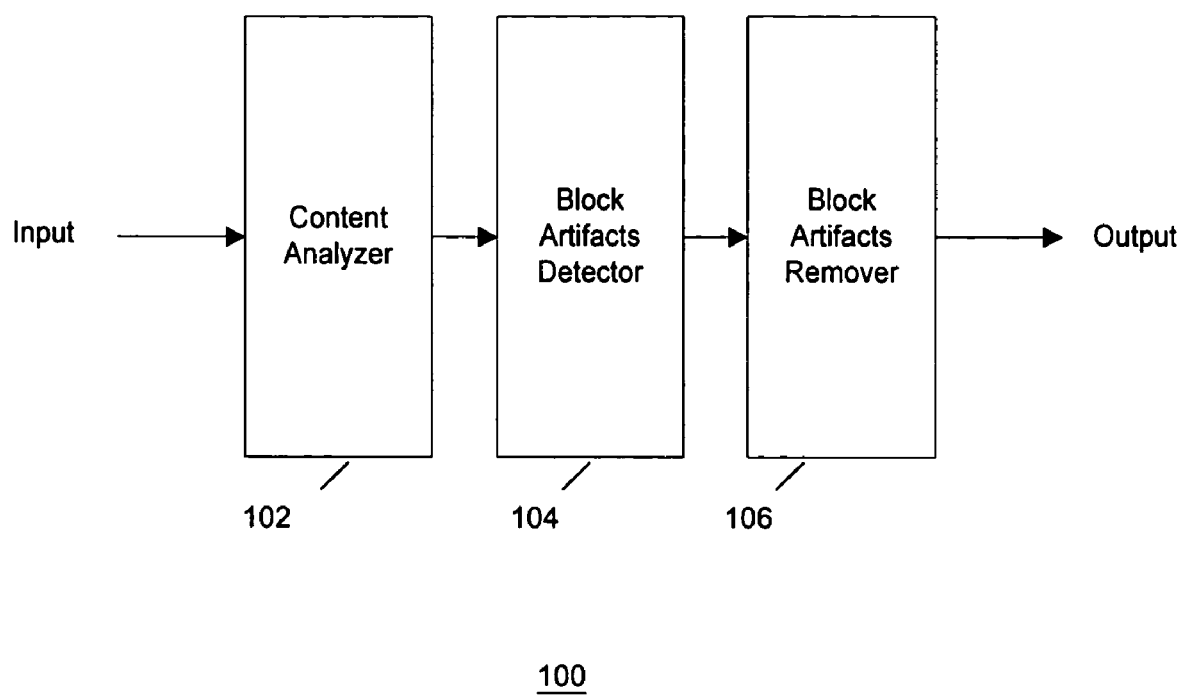
FIG. 1 shows a functional block diagram of a content-adaptive block artifact removal system, according to an embodiment of the present invention.

Accordingly, in one embodiment, the present invention provides an effective and intelligent image processing method and system to reduce and/or remove block artifacts from compressed/coded image/video. FIG. 1 shows a block diagram of such an image processing system 100 according to an embodiment of the present invention. The system 100 includes a content analyzer 102, a block artifacts detector 104 and a block artifacts remover 106.

The block artifacts removal process implemented by the system 100 is based on content analysis of the input image/video by the content analyzer 102. Three example categories for analyzing the content of the image/video are: (1) Low level of motion vs. High level of motion, (2) Low activity (Flat regions) vs. High activity (Patterned regions), and (3) Low compression rate vs. High compression rate.

Block artifacts are detected by analyzing the contents of the image/video according to the three categories listed above. Each M-by-M sub-block of pixels in the input image is classified according to the above three categories. Then, depending on the classification result, block artifacts are detected by the block artifacts 104 and removed by the block artifacts remover 106.

Figure 2:
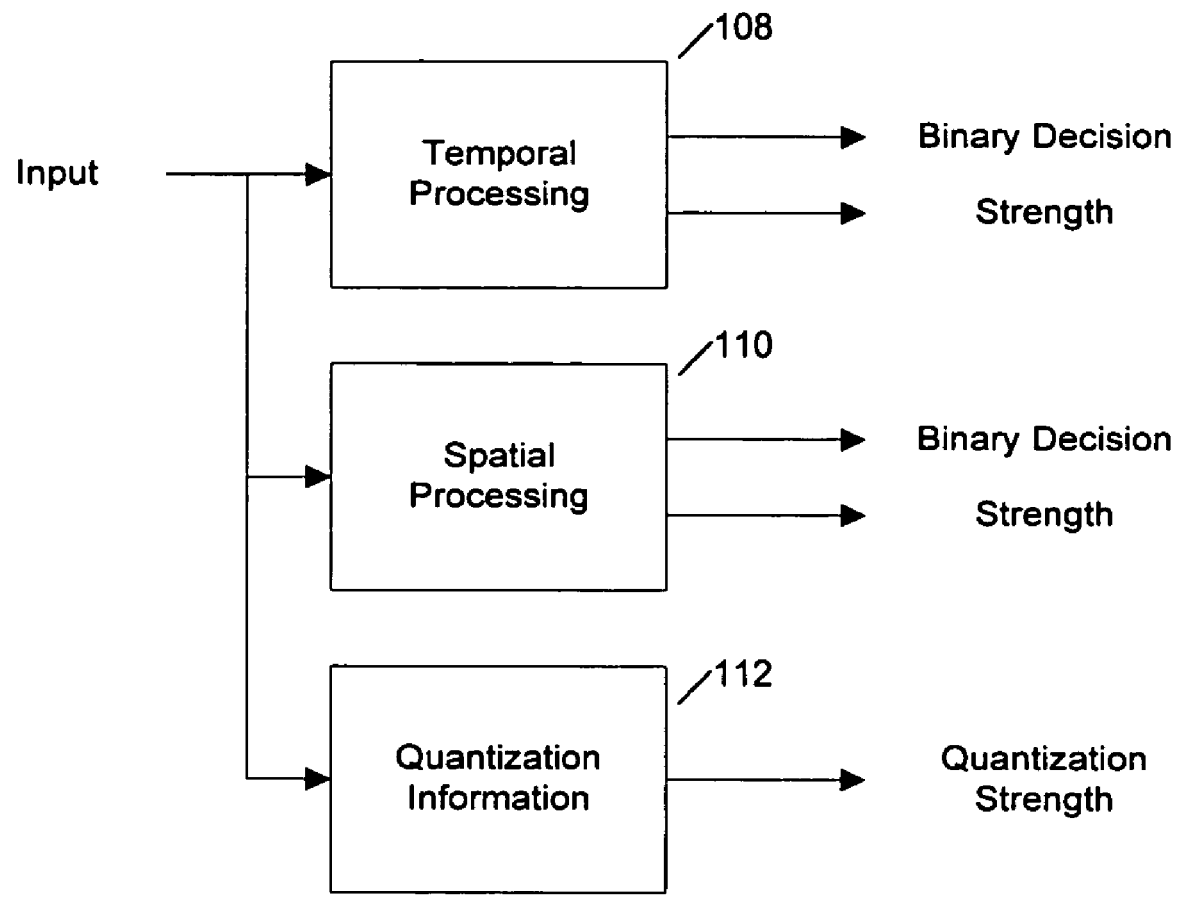
FIG. 2 shows a functional block diagram of an embodiment of the content analyzer in the system of FIG. 1.

FIG. 2 shows a functional block diagram of the content analyzer 102 according to an embodiment of the present invention. The content analyzer 102 includes a temporal processor 108, a spatial processor 110 and quantization information unit 112.

To enable detection of block artifacts in a current block $B_{ij}$ of a current image frame f(t) at time t, the temporal processor 108 analyzes the corresponding blocks $B^*_{ij}$ in the past frames f(t-k), k=1 ... R (wherein i is the row index of block $B_{ij}$ in the frame, j is the column index of block $B_{ij}$ in the frame, wherein i=1 ... P, and j=1 ... Q, such that frame includes P-by-Q number of sub-blocks, and wherein R is the total number of past reference frames stored by the video decoding/processing system.

Figure 5:
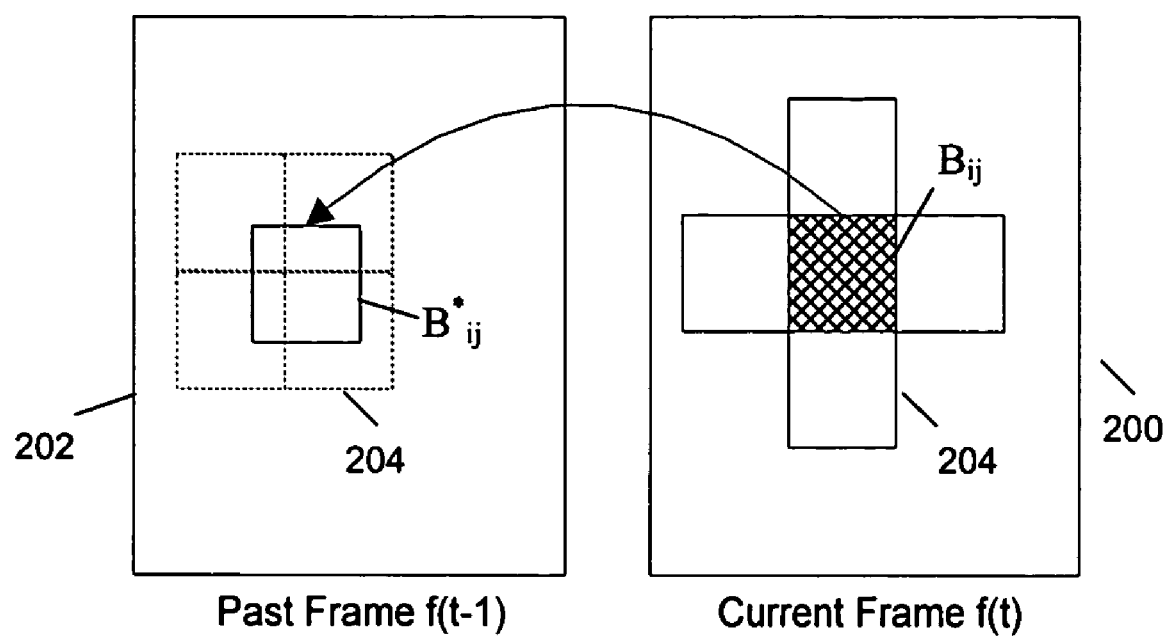
FIG. 5 shows an example of short-term temporal processing (motion estimation) by the content analyzer of FIG. 2.

Referring to the example in FIG. 5, a current frame (e.g., f(t)) 200 and a past frame (e.g., f(t-1)) 202 are shown, wherein each frame includes multiple blocks 204. For a short-term temporal analysis, the corresponding block $B^*_{ij}$ is located in the past frame f(t-1) by a motion estimation technique, e.g., using the motion vectors obtained from the MPEG decoder or by applying motion estimation algorithms. The blocks $B_{ij}$ and $B^*_{ij}$ are compared, and if the edges that appear at the block boundaries of the current block $B_{ij}$ do not appear at the corresponding boundaries of $B^*_{ij}$ in the past frame, these edges are considered to be block artifacts to be removed by the block artifacts remover 106.

In FIG. 5, the block boundaries of $B_{ij}$ in the frame f(t) no longer fall on the block boundaries in the past frame f(t-1). Thus, image features will likely appear simultaneously in $B_{ij}$ and $B^*_{ij}$, while block artifacts will likely appear only in the block boundaries of $B_{ij}$.

The output of the short-term temporal processing in the temporal processor 108 (FIG. 2) is a binary decision indicating the presence of block artifacts at each boundary pixel. A secondary output of the temporal processor 108 may provide the new pixel value $p''_{ij}$ to replace the original pixel value $P_{ij}$ in the current block $B_{ij}$. The new pixel value $p''_{ij}$ can be computed, for example, from the corresponding pixel value $p^*_{ij}$ in $B^*_{ij}$. However, even if the perfect match has been found during the motion estimation, the exact pixel values can still be different. Therefore, instead of directly using the pixel value $p^*_{ij}$ in $B^*_{ij}$, the relationship between the pixel value $p^*_{ij}$ and its neighbors in $B^*_{ij}$ may be considered, and then the current pixel value in $B_{ij}$ modified to maintain a similar relationship with its neighbors.

The short-term temporal analysis is applicable to block artifacts in all types of image/video contents. The effectiveness of the short-term temporal processing depends on the performance of the motion estimation algorithm.

For a long-term temporal analysis, the temporal information is collected over a longer period of time. For example, the entire GOP (Group of Pictures) is involved in the computation of the appropriate data needed for the analysis. The long-term temporal information indicates the average level of block artifacts over the past frames f(t−k), k=1 . . . G, where G is the size of GOP (e.g., G=15). This helps to detect a sudden increase in block artifacts, for example, due to high motion contents. As such, while the short-term temporal processing is suitable for all content types, the long-term temporal processing is more effective when there is a sudden change of scenes or motion contents. The average level of block artifacts may be computed as the average pixel value difference across all block boundaries in each frame. When there is a sudden increase in motion content, stronger block artifacts tend to appear over the motion regions, increasing the average pixel value difference. This change of average pixel difference is detected by the block artifacts detector 104. In this case, the main output of the long-term processing from the temporal processor 108 is a binary decision indicating the presence of a sudden increase in the block artifacts level. The secondary output of the temporal processor 108 may include the strength of the filtering to be applied, i.e., the degree by which the block artifacts level has increased. In another implementation, the average level of block artifacts is computed separately for low-activity (e.g., flat) regions and high-activity (e.g., patterned) regions. This is more effective because high motion contents affect patterned regions more than the flat regions.

If the motion content is negligible (e.g., low motion), then the long-term temporal processing may not be effective. In that case, the spatial processor 110 is utilized, wherein blocks are separated into low activity (e.g., flat) regions and high activity (e.g., patterned) regions. Human vision is more sensitive to block artifacts in low activity regions, and low activity regions often represent flat background areas. Therefore, strong low-pass filtering is applied to low activity regions to smooth the block boundaries and remove block artifacts. In high activity regions, image features and real edges are mixed with block artifacts, wherein careful identification of block artifacts is required. To avoid blurring or removing real image features, moderate directional filtering is applied in high activity regions.

The activity level is computed, for example, from the mean and variance of the blocks on each side of the block boundary. When the variance within a single block is low, the block is considered as a low-activity block. When the variance within a single block is high, the block is considered as a high-activity block. When both blocks are low-activity blocks across a boundary, the difference in their mean values indicates the strength of the filter to be applied. As such, when the difference in mean values is high, a stronger low-pass filtering is applied to reduce the gap. When either block turns out to be a high-activity block, a directional filtering is applied instead.

The main output of the spatial processing from the spatial processor 110 is the binary decision of whether each boundary pixel belongs to a low-activity region or a high-activity region. When the main output indicates a low-activity region, a secondary output provides the filter strength for the low-pass filter. When the main output indicates a high-activity region, the secondary output provides the filter strength of the directional filter.

A quantization parameter, either supplied by the MPEG decoder or estimated within the picture, provides useful information to the block artifacts detector 104. The quantization information unit 112 provides such quantization information which indicates the amount of artifacts expected across the picture. At high compression rates (e.g., large quantization step sizes), more block artifacts are expected, while at low compression rates (e.g., small quantization step sizes), less block artifacts are expected. The block artifacts detector 104 and the block artifacts remover 106 utilize such information when processing the block boundaries.

Figure 3:
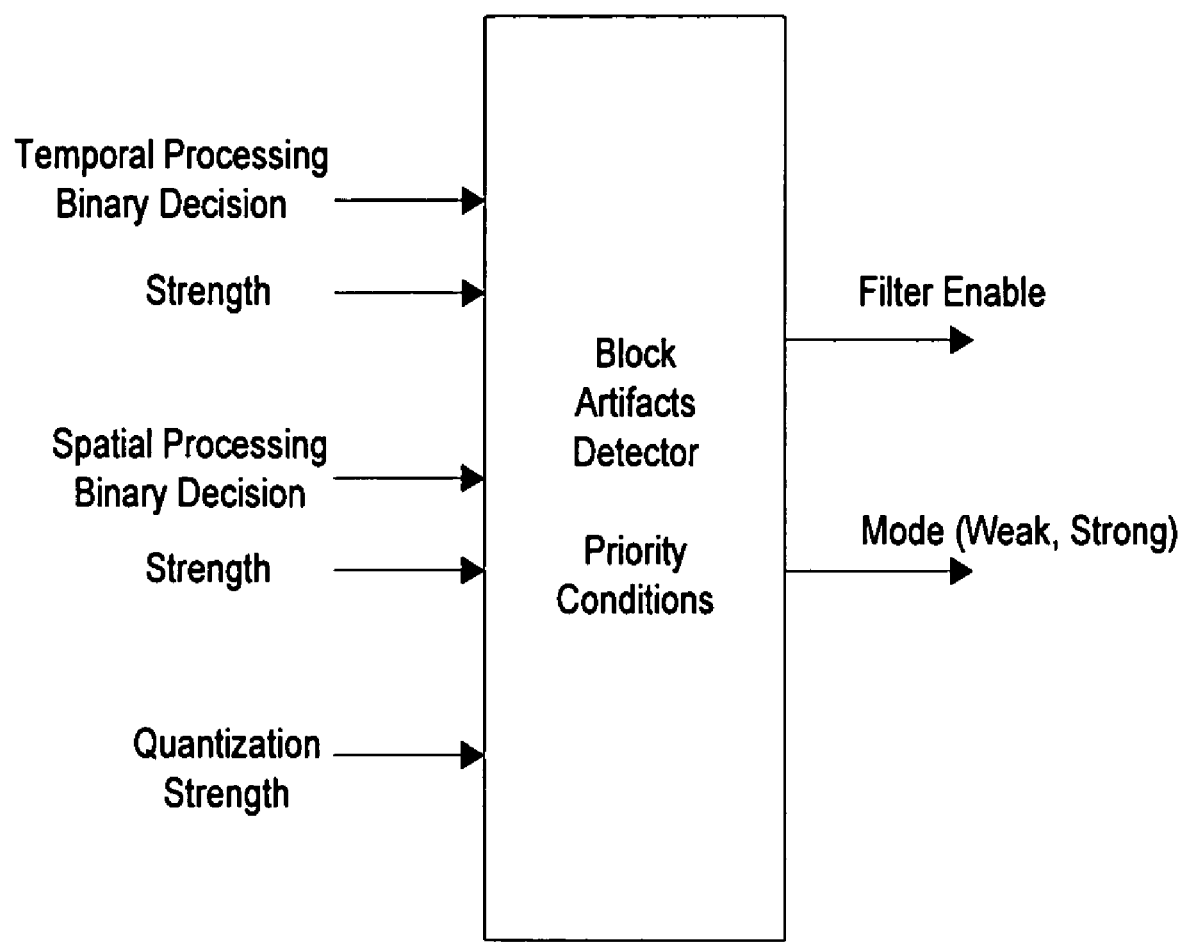
FIG. 3 shows a functional block diagram of an embodiment of the block artifacts detector in the system of FIG. 1.

FIG. 3 shows an example of the block artifacts detector 104. The block artifacts detector 104 detects block artifacts using the content analysis results from the temporal processor 108, the spatial processor 110, and the quantization information unit 112 of the content analyzer 102. The detector 104 imposes a set of priority conditions to the analysis results to determine whether each pixel at the block boundary is to be classified as a block artifact or not. The main output of the detector 104 is e.g. a binary decision where the value of '1' indicates a block artifact and '0' indicates a non-block artifact. The secondary output of the detector 104 provides auxiliary information on how the pixel will be processed further (e.g. weak filtering versus strong filtering). When a pixel is determined to be a block artifact by the detector 104, the block artifacts remover 106 applies a block artifact removal process to the pixel value according to the information supplied from the secondary output of the detector 104.

In one embodiment, the block artifacts detector 104 implements the following set of priority conditions: A higher priority is given to the short-term temporal processing output and the spatial processing output. The long-term temporal processing output and the quantization information are treated as auxiliary information to adjust the strength of filtering.

Figure 4:
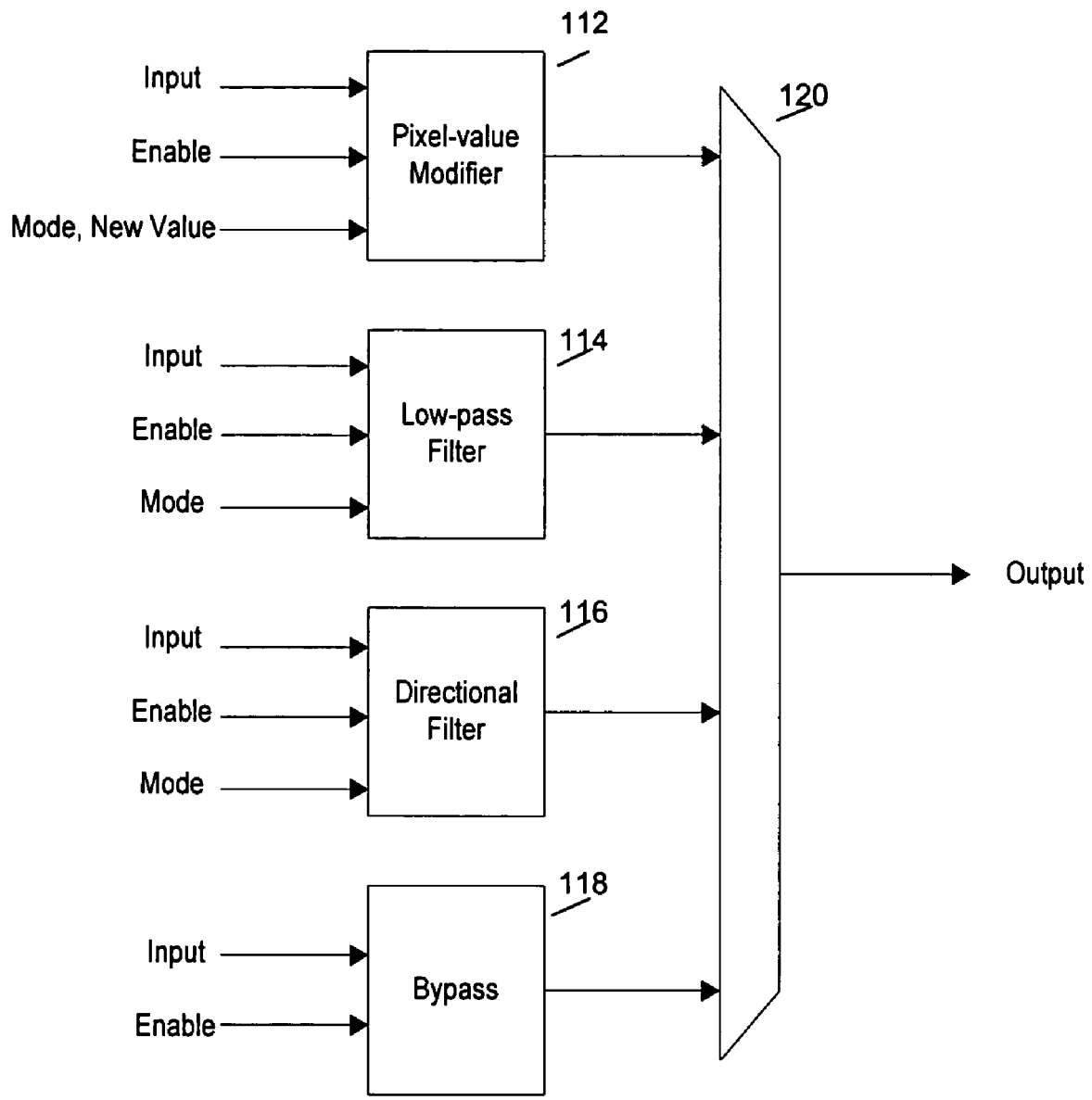
FIG. 4 shows a functional block diagram of an embodiment of the block artifacts remover in the system of FIG. 1.

Once the block artifacts are detected by the detector 104, the detected artifacts are reduced or removed by the block artifacts remover 106. FIG. 4 shows an example of the block artifacts remover 106, comprising a pixel-value modifier 112, a low-pass filter 114, a directional filter 116, a bypass 118 and a multiplexer 120. The block artifacts remover 106 employs three separate filtering techniques.

In the first filtering technique implemented by the pixel-value modifier 112, a pixel value at the block boundary is modified to a specified value. The new value $p''_{ij}$ is computed, for example, from the content analysis result or the pixel value from the corresponding block $B^*_{ij}$ in the past frame f(t−1). Then, the original pixel value $P_{ij}$ at the block boundary is replaced by the new value $p''_{ij}$. If stronger filtering is required, the modifier 112 checks neighboring pixel values and adjusts the current pixel value such that the pixel value transition is smoother.

In the second filtering technique implemented by the low-pass filter 114, block artifacts are removed by applying low-pass filtering to smooth out the block boundaries for low-activity regions. The strength and extent of low-pass filtering may be adjusted depending on the particular needs and implementations. For example, the strength and extent of low-pass filters may be adjusted depending on the particular needs and implementations, as supplied by the secondary output from the detector. In an example implementation, the following low pass filtering h[n] is applied to the left boundary pixel at a vertical block boundary:

$$h[n] = [h(-3)h(-2)h(-1)h(0)h(1)h(2)]$$

wherein n is a spatial index (e.g., −3 . . . 2). The low pass filtering h computes the weighted average of neighboring pixel values.

A mirror symmetrical filter is applied to the right boundary pixel at a vertical block boundary. The same filter coefficients are applied to the horizontal boundary as well by smoothing the pixels vertically across the boundary. When the filtering strength is "weak", only one pixel at each side of the block boundary may be filtered. When the filtering strength is "strong", three or four pixels on each side of the boundary may be filtered.

When block artifacts are mixed with real edges and image features at the block boundary, strong low-pass filtering cannot be applied. As such, the third filtering technique implemented by directional filter 116 (directional filtering) is applied. In the simplest form of the directional filter, the pixel differences of surrounding pixels along different directions are examined and the direction in which the pixel difference is the smallest is identified. Then, the pixel values are smoothed along this direction only. In a more intelligent implementation, the pixel patterns are examined and analyzed such that only non-pattern pixels are processed (i.e., the image patterns near the block boundary are examined and analyzed such that the block boundary pixels are processed without affecting these image patterns). A bypass 118 is also provided to maintain the original pixel value as default. The multiplexer 120 allows sections of the output from one of the units 112, 114, 116 and 118, as necessary. Only one of the units 112, 114, 116, and 118 is activated at any given time, and the MUX 120 transmits the output of the activated unit.

In an example implementation of the directional filter 116, the edge direction is found within a e.g. 3-by-3 pixel set neighboring a center pixel at the block boundary. In Diagram 1 below, the center pixel marked 'X' below is the boundary pixel. The pixels marked 'a' through 'h' are the neighboring pixels.

Diagram 1

| a | e | b |
|---|---|---|
| h | X | f |
| d | g | c |

The following set of pixel value differences are calculated along 4 directions:

| horizontal: | $|h-f|$ |
|---|---|
| vertical: | $|e-g|$ |
| diagonal down: | $|a-c|$ |
| diagonal up: | $|d-b|$ |

Then, the smallest pixel value difference is located and denoted as the edge direction. The pixel value 'X' at the block boundary in Diagram 1 above is modified so that there is a smooth transition along the edge direction. In "weak" filtering, a plain averaging may be used. In "strong" filtering, the transition is made even smoother.

In a more intelligent implementation of the directional filter 116, the four pixel value differences are compared such that the edge direction is declared only if the difference along the edge direction is significantly smaller than the others (to ensure that there indeed exists an edge). In a yet more exhaustive implementation of the directional filter 116, a larger neighboring area is examined and more edge directions (e.g., greater than 4) are considered. The complexity of the directional filtering of this kind is limited by the particular implementation costs.

Accordingly, for the artifacts remover 106, if the main output of the short-term temporal processing indicates the presence of block artifacts, then the current pixel value at the block boundary is modified by the pixel-value modifier 112 to a new value supplied by the secondary output of the short-term temporal processing. In addition, if the long-term temporal processing and/or the quantization information indicate need for stronger filtering, this fact is reflected in the pixel-value modifier 112 to adjust the filtering strength and vice versa.

Otherwise, if the main output of the spatial processing indicates a low-activity region, the low-pass filter 114 is applied to the current pixel value. In addition, if the long-term temporal processing and/or the quantization information indicate the need for strong or weak filtering, this fact is reflected in the low-pass filter 114 to adjust the filtering strength. For example, when the filtering is "weak", only one pixel on each side of the boundary is modified. When the filtering is "strong", up to e.g. 3 pixels on each side of the boundary are modified.

Otherwise, if the main output of the spatial processing indicates the high-activity region, the directional filter 116 is applied to the current pixel value. In addition, if the long-term temporal processing and/or the quantization information indicate for a strong or weak filtering, this fact is reflected in the directional filter 116 to adjust the filtering strength. That is, when the filtering is "weak", a simple average computed along the edge direction replaces the pixel value at the boundary. When the filtering is "strong", the pixel value transition along the edge direction is made even smoother. Otherwise, the original pixel value is bypassed by the bypass 118 to the final output.

As such, the present invention provides an image processing method and a system that collect and assemble information about the contents of the image/video in an effective and intelligent manner and effectively utilize such information to reduce/remove block artifacts in the compressed/coded image/video.

While the present invention is susceptible of embodiments in many different forms, there are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein. The present invention has been described in considerable detail with reference to certain preferred versions thereof; however, other versions are possible. Therefore, the spirit and scope of the appended claims should not be limited to the description of the preferred versions contained herein.

What is claimed is:

1. An image processing system for removing block artifacts in compressed images, wherein each image comprises multiple blocks of pixels, comprising:
a content analyzer processor for analyzing the contents of a digital image and indicating the type of content in the image for identifying artifacts, wherein the content analyzer includes a temporal processor that performs short-term temporal content analysis for a sequence of images, by comparing a current block in a current image to the corresponding block in another image in the sequence, wherein if edges at block boundaries of the current block do not appear for the corresponding block, then the edges are considered to be block artifacts in the current block;
an artifact detector processor configured for assigning priority to the content analysis results and detecting block artifacts in the digital image based on the content analysis results of the content analyzer processor; and
an artifact remover processor configured for removing artifacts detected by the artifact detector processor from the image.

2. The system of claim 1 wherein the content analyzer analyzes level of motion in a sequence of images.

3. The system of claim 1 wherein the content analyzer analyzes image activity rate.

4. The system of claim 1 wherein the content analyzer analyzes image compression rate.

5. The system of claim 1 wherein the artifact detector detects block artifacts in the digital image based on the content analysis of the content analyzer, wherein the artifact detector evaluates a set of priority conditions in utilizing the content analysis results to generate an artifact detection decision for each pixel at a block boundary.

6. The system of claim 5 wherein the artifact detector detects block artifacts in the digital image based on the content analysis of the content analyzer, wherein the artifact detector evaluates a set of priority conditions in utilizing the content analysis results to generate an artifact detection decision for each pixel at a block boundary, such that the artifact detector further assigns a higher priority to short-term temporal content analysis results from the content analyzer.

7. The system of claim 1 wherein the artifact detector generates an artifact detection decision and the artifact remover selects filtering to remove block artifacts based on the artifact detection decision.

8. The system of claim 1 wherein the content analyzer includes a spatial processor that separates blocks in an image into low activity regions and high activity regions.

9. The system of claim 8 wherein the artifact detector detects block artifacts in the digital image based on the content analysis of the content analyzer, wherein the artifact detector evaluates a set of priority conditions in utilizing the content analysis results to generate an artifact detection decision for each pixel at a block boundary, such that the artifact detector further assigns a higher priority to spatial processor results of the content analyzer.

10. The system of claim 1 wherein the content analyzer includes a temporal processor that performs long-term temporal content analysis for a sequence of images by collecting long-term temporal information indicating the average level of block artifacts over the past frames f(t−k), k=1 . . . P, wherein P is the size of a group of images.

11. The system of claim 10 wherein the artifact detector utilizes the long-term temporal information from the content analyzer to determine sudden image changes indicating block artifacts.

12. The system of claim 10 wherein the content analyzer computed the average level of block artifacts as the average pixel value difference across all block boundaries in each frame.

13. The system of claim 10 wherein the artifact detector detects change of average pixel difference indicating a change in block artifacts.

14. The system of claim 10 wherein the content analyzer generates a binary decision indicating the presence of a sudden increase in the block artifacts.

15. The system of claim 10 wherein the artifact detector generates an artifact detection decision, and the artifact remover selects filtering to remove block artifacts based on the artifact detection decision.

16. An image processing method for content-adaptive removal of block artifacts in compressed images wherein each image comprises multiple blocks of pixels, comprising:
analyzing the contents of a digital image and indicating the type of content in the image for identifying artifacts using a content analyzer processor, wherein the step of analyzing further includes the steps of performing short-term temporal content analysis for a sequence of images by comparing a current block in a current image to the corresponding block in another image in the sequence, wherein if edges at block boundaries of the current block do not appear for the corresponding block, then the edges are considered to be block artifacts in the current block;
assigning priority to the content analysis results and detecting block artifacts in the digital image based on the content analysis results using an artifact detector processor; and
removing artifacts detected by the artifact detector from the image using an artifact remover processor.

17. The method of claim 16 wherein the step of analyzing further includes the steps of determining level of motion in a sequence of images.

18. The method of claim 16 wherein the step of analyzing further includes the steps of determining image activity rate.

19. The method of claim 16 wherein the step of analyzing further includes the steps of determining image compression rate.

20. The method of claim 16 wherein the step of detecting further includes the steps of evaluating a set of priority conditions in utilizing the content analysis results to generate an artifact detection decision for each pixel at a block boundary.

21. The method of claim 20 wherein the step of detecting further includes the steps of evaluating a set of priority conditions in utilizing the content analysis results to generate an artifact detection decision for each pixel at a block boundary, by assigning a higher priority to short-term temporal content analysis results.

22. The method of claim 16, wherein:
the step of detecting further includes the steps of generating an artifact detection decision, and
the step of removing further includes the steps of selecting filtering to remove block artifacts based on the artifact detection decision.

23. The method of claim 16 wherein the step of analyzing further includes the steps of performing spatial processing to separate blocks in an image into low activity regions and high activity regions.

24. The method of claim 23 wherein the step of detecting further includes the steps of evaluating a set of priority conditions in utilizing the content analysis results to generate an artifact detection decision for each pixel at a block boundary, by assigning a higher priority to spatial processor results.

25. The method of claim 16 wherein the step of analyzing further includes the steps of performing long-term temporal content analysis for a sequence of images by collecting long-term temporal information indicating the average level of block artifacts over the past frames f(t−k), k=1 ... G, wherein G is the size of a group of images.

26. The method of claim 25 wherein the step of detecting further includes the steps of utilizing the long-term temporal information to determine sudden image changes indicating block artifacts.

27. The method of claim 25 wherein the step of analyzing further includes the steps of computing the average level of block artifacts as the average pixel value difference across all block boundaries in each frame.

28. The method of claim 25 wherein the step of detecting further includes the steps of detecting change of average pixel difference indicating a change in block artifacts.

29. The method of claim 25 wherein the step of analyzing further includes the steps of generating a binary decision indicating the presence of a sudden increase in the block artifacts.

30. The method of claim 25 wherein:
the step of detecting further includes the steps of generating an artifact detection decision, and
the step of removing further includes the steps of selecting filtering to remove block artifacts based on the artifact detection decision.

31. An image processing system for removing block artifacts in compressed images, wherein each image comprises multiple blocks of pixels, comprising:
a content analyzer processor for analyzing the contents of a digital image and indicating the type of content in the image for identifying artifacts;
an artifact detector processor configured for assigning priority to the content analysis results and detecting block artifacts in the digital image based on the content analysis results of the content analyzer processor; and
an artifact remover processor configured for removing artifacts detected by the artifact detector processor from the image;
wherein the content analyzer includes a temporal processor that performs short-term temporal content analysis for a sequence of images, by comparing a current block in a current image to the corresponding block in another image in the sequence, wherein if edges at block boundaries of the current block do not appear for the corresponding block, then the edges are considered to be block artifacts in the current block;
wherein the artifact detector detects block artifacts in the digital image based on the content analysis of the content analyzer, wherein the artifact detector evaluates a set of priority conditions in utilizing the content analysis results to generate an artifact detection decision for each pixel at a block boundary, such that the artifact detector further assigns a higher priority to short-term temporal content analysis results from the content analyzer.

32. An image processing system for removing block artifacts in compressed images, wherein each image comprises multiple blocks of pixels, comprising:
a content analyzer processor for analyzing the contents of a digital image and indicating the type of content in the image for identifying artifacts;
an artifact detector processor configured for assigning priority to the content analysis results and detecting block artifacts in the digital image based on the content analysis results of the content analyzer processor; and
an artifact remover processor configured for removing artifacts detected by the artifact detector processor from the image;
wherein the content analyzer includes a spatial processor that separates blocks in an image into low activity regions and high activity regions;
wherein the artifact detector detects block artifacts in the digital image based on the content analysis of the content analyzer, wherein the artifact detector evaluates a set of priority conditions in utilizing the content analysis results to generate an artifact detection decision for each pixel at a block boundary, such that the artifact detector further assigns a higher priority to spatial processor results of the content analyzer.

33. An image processing method for content-adaptive removal of block artifacts in compressed images wherein each image comprises multiple blocks of pixels, comprising:
analyzing the contents of a digital image and indicating the type of content in the image for identifying artifacts using a content analyzer processor;
assigning priority to the content analysis results and detecting block artifacts in the digital image based on the content analysis results using an artifact detector processor; and
removing artifacts detected by the artifact detector from the image using an artifact remover processor;
wherein the step of analyzing further includes the steps of performing short-term temporal content analysis for a sequence of images by comparing a current block in a current image to the corresponding block in another image in the sequence, wherein if edges at block boundaries of the current block do not appear for the corresponding block, then the edges are considered to be block artifacts in the current block;
wherein the step of detecting further includes the steps of evaluating a set of priority conditions in utilizing the content analysis results to generate an artifact detection decision for each pixel at a block boundary, by assigning a higher priority to short-term temporal content analysis results.

34. An image processing method for content-adaptive removal of block artifacts in compressed images wherein each image comprises multiple blocks of pixels, comprising:
analyzing the contents of a digital image and indicating the type of content in the image for identifying artifacts using a content analyzer processor;
assigning priority to the content analysis results and detecting block artifacts in the digital image based on the content analysis results using an artifact detector processor; and
removing artifacts detected by the artifact detector from the image using an artifact remover processor;
wherein the step of analyzing further includes the steps of performing spatial processing to separate blocks in an image into low activity regions and high activity regions;
wherein the step of detecting further includes the steps of evaluating a set of priority conditions in utilizing the content analysis results to generate an artifact detection decision for each pixel at a block boundary, by assigning a higher priority to spatial processor results.

* * * * *